Aug. 27, 1963 R. C. TOTZ 3,102,259
CODE CONVERSION ARRANGEMENT
Filed Aug. 24, 1960
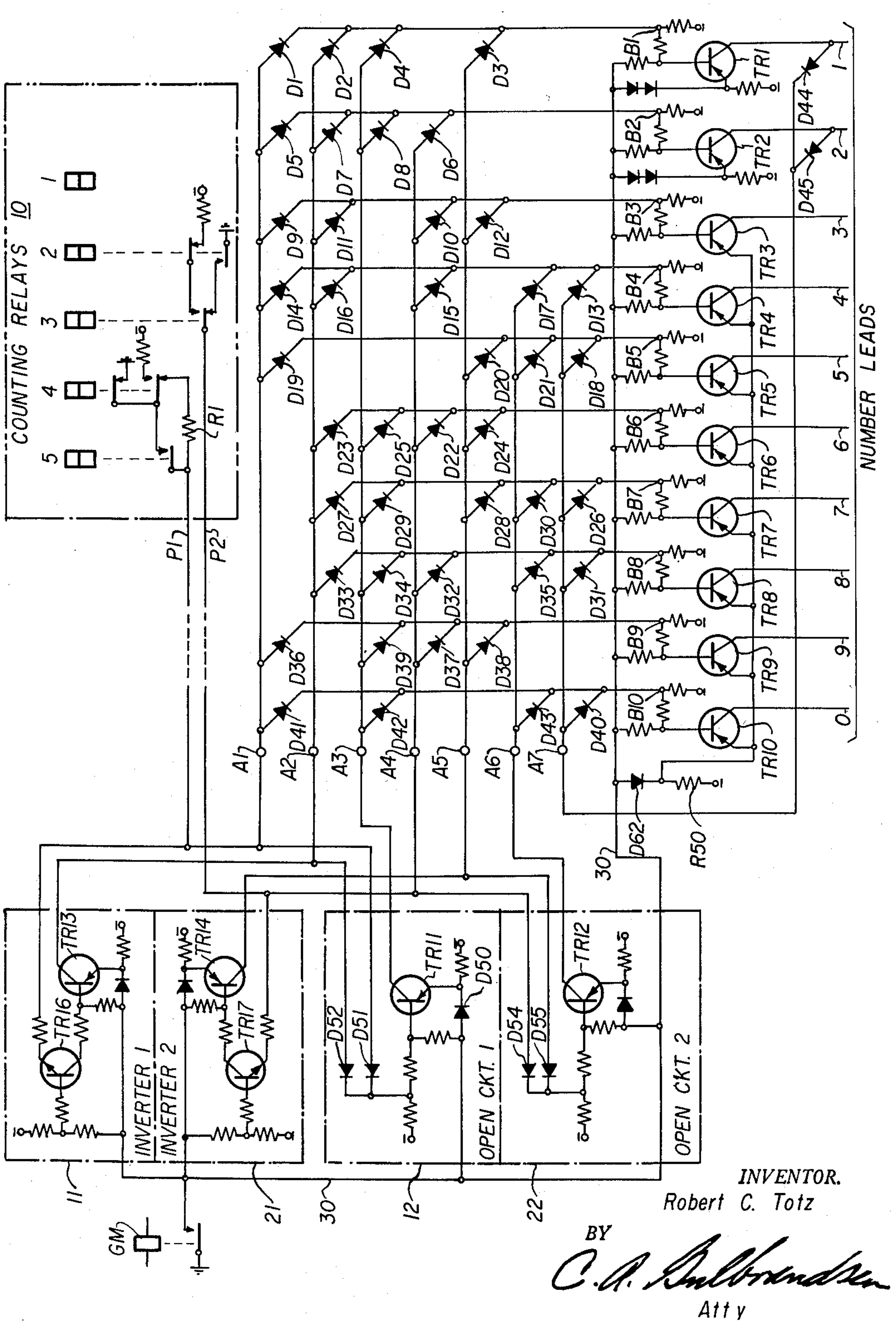
INVENTOR.
Robert C. Totz
BY C. A. Gulbrandsen
Atty

United States Patent Office 3,102,259
Patented Aug. 27, 1963

3,102,259

CODE CONVERSION ARRANGEMENT

Robert C. Totz, Belvidere, Ill., assignor, by mesne assignments, to Automatic Electric Laboratories, Inc., Northlake, Ill., a corporation of Delaware Filed Aug. 24, 1960, Ser. No. 51,635
12 Claims. (Cl. 340—347)

This invention relates to a code conversion arrangement, and more particularly to a conversion arrangement for use in a marker of a telephone system to receive coded digital signals from a counting circuit and convert them to marking potentials.

United States Patent No. 2,714,628 describes an automatic telephone system in which a switchboard can be used to serve equally well as a separate 100-line board or as a 100-line unit in a selector type board, and which can be easily expanded in the field from a 100-line board to a selector board. This is accomplished by using the same link circuit in both types of boards. The link circuit includes the transmission and control circuits, the dialing, the pulse counting and lockout-timing relays. In a 100-line board each link circuit is used between a finder switch and a connector switch. A marker is common to all of the links. After each digit is dialed and registered by the pulse-counting relays, the marker is seized, the registered digit is transmitted in coded form to the marker and translated by a group of marking relays to a potential on one out of ten number leads to control the switching.

In a selector board the link circuits are used ahead of the selector switches and connectors. All control functions are retained in the link-control relays which become part of the selector. In each 100-line unit one marker is common to the selectors and another is common to the connectors. Each of these markers includes a group of marking relays for translating from the coded digital signal output from the counting relays to a one-out-ten marking signal. After a selector has seized an idle connector, the dial pulses are counted in the link and the dialed number is transmitted by the link through the selector switch to the connector and thence to the connector marker for making the individual tens or units selection. In order to accomplish the indicated pulse transmission and line selection operations over the customary three conductors of a selector switch, there is provided a pulse-counting and number selection scheme for transmitting any one of ten digits by a single pulse over two conductors. In the coding arrangement used, the signal on each of the two conductors is battery, ground, open, or resistance ground. In the interval between digits, it is necessary to seize the marker, translate the coded digital signal, and complete the selection and switching operation. In case the marker is busy with other calls for an unusually long time, the calling party receives busy tone if he dials the next digit before the selection is completed.

The principal object of this invention is to reduce the marking switching time of a common marker in a telephone switching system.

The marker switching time may be reduced by using an electronic circuit instead of relays for the code translation. Translation arrangements are known in which diode matrices are used. However such a matrix requires that all of the input signals be of the same characteristic, namely of a given polarity with respect to a reference potential, and can detect only the presence or absence of this characteristic. However if the signal on each signal conductor is one of three or more conditions, such a matrix cannot determine exactly which one of the conditions is present.

According to the invention, an arrangement is provided for responding to each of the possible signal conditions on each signal conductor, to convert each possible signal condition on each signal conductor to a given condition which is then supplied to an individual input of the matrix.

In a specific form of the invention, the signal conditions include a connection to ground, a connection to negative potential, and an open connection. The matrix is designed to respond to ground signals, and its first input terminal is connected directly to a signal conductor. An inverter unit responds to negative potential signals on the signal conductor to supply ground signals to a second input terminal of the matrix. An "open" unit responds to the absence of ground on both the first and second matrix input terminals to supply a ground signal to a third input terminal. Other signal conductors are likewise connected to three corresponding input terminals of the matrix.

Further according to the invention, each output terminal of the matrix is coupled to an individual amplifying device, such as a transistor, to a marking conductor. A start conductor is connected to each of the amplifying devices, and also to each of the inverter and "open" units. Each amplifying device is arranged to be blocked by a ground signal on the corresponding matrix output terminal. In response to a ground signal on the start conductor, each amplifying device which is not blocked conducts to apply a ground signal to its corresponding marking conductor.

Further according to the invention, a fourth signal condition, resistance ground, may be applied to one of the signal conductors. Most of the amplifying devices are blocked by this signal the same as for a direct ground signal. However some of the amplifying devices have a marginal input biasing arrangement so that they are blocked by direct ground but not by resistance ground. The marking conductors correspondijng to these latter amplifying devices are coupled through blocking diodes to another input terminal of the matrix, so that a ground marking potential on any one of these latter marking conductors is supplied as an input signal to the last said input terminal.

The above-mentioned and other objects and features of this invention and the manner of obtaining them will become more apparent, and the invention itself will be best understood, by reference to the following description of an embodiment of the invention taken in conjunction with the single FIGURE of the accompanying drawing which is a schematic diagram of a code translating arrangement according to the invention.

The invention is described as embodied in a system of the type disclosed in U.S. Patent 2,714,628 for an "Automatic Telephone System," issued August 2, 1955, to H. P. Boswau. In that system each link includes a five-relay counting chain operated in response to dial pulses. After each digit is completely dialed a common marker is seized, and the dialed digit is transmitted in coded form over two signal conductors P1 and P2 to marker relays which translate the code to a ground signal on one of ten number leads. In the patent, FIGS. 1 and 1A are simplified drawings showing the counting relays and the marker relays respectively. Referring to the single FIGURE of the present application, the box shows the counting relays further simplified to show only the five relay coils and the contact arrangement for applying the signal code to the signal conductors P1 and P2; and the remainder of the drawing shows an electronic circuit arrangement which according to the invention replaces the marker relays to translate the coded digital signal to the marking potential on one of the ten number leads.

The code translating arrangement of the marker comprises a matrix having diodes D1–D43 connected in a predetermined arrangement between input terminals A1–A7 and output terminals B1–B10; ten transistors TR1–TR10 coupled between the output terminals B1–B10 respectively and the number leads 1–9 and 0 respectively; and a circuit arrangement comprising two inverter circuit units 11 and 21, and two "open" circuit units 12 and 22 coupled between the signal conductors P1 and P2 and the matrix input terminals A1–A6. A start conductor 30 is coupled to each of the transistors and to each of the inverter units and "open" units. Upon seizure of the marker by a link, the marker relay GM connects ground to the start conductor 30.

In the drawing, the terminals designated by a minus sign are connected to the negative terminal and the points connected to a ground symbol are connected to the positive terminal of the exchange battery (not shown). The negative terminals will be referred to as battery.

In the counting relay circuit 10, the signal conductor P1 may be connected to battery through a 100-ohm resistor with relays 4 and 5 both operated, to direct ground with relay 4 normal and relay 5 operated, an open connection with relay 4 operated and relay 5 normal, or resistance ground through the 100-ohm resistor R1 with relays 4 and 5 both normal. Signal conductor P2 may be connected to battery through a 100-ohm resistor with relay 2 normal and relay 3 operated, to direct ground with relay 2 operated and relay 3 normal, or an open connection with relays 2 and 3 either both operated or both normal.

Each of the output transistors TR1 and TR2 has its base electrode connected through a 200-ohm resistor to the corresponding matrix output terminal and thence through a 2200-ohm resistor to battery; and each base electrode is also connected to the start conductor 30 through a 330-ohm resistor. These two transistors each have their emitter electrodes connected to battery through a 2000-ohm resistor, and to the start conductor 30 through two series-connected diodes. Each of the other output transistors TR3–TR10 has its base electrode connected through a 1000-ohm resistor to the corresponding matrix output terminal and thence through a 1500-ohm resistor to battery; and these base electrodes are also connected through 100-ohm resistors to the start conductor 30. The emitter electrodes of these ten transistors are connected in common through a 750-ohm resistor R50 to battery and through a diode D62 to the start conductor 30. Thus each of these ten output transistors has its base electrode forward biased to the negative battery potential, and responsive to a ground signal on the start conductor 30 through a diode connection to the emitter circuits each would tend to conduct into the loads connected to the number leads from the collector electrodes. The principal of operation is to block conduction of nine of the output transistors by ground signals applied through the matrix, leaving the desired output transistor actuated to conduct into the load. Direct ground on any one of the output terminals B1–B10 will block conduction of the corresponding transistors. Also resistance ground supplied through the 100-ohm resistor R1 to the output terminals B3–B10 will block conduction of the corresponding transistors. However transistors TR1 and TR2 are biased so that they will not be blocked by the resistance ground at the corresponding terminal B1 or B2.

The first inverter unit 11 comprises an NPN transistor TR16 in the base circuit of a PNP power transistor TR13. Transistor TR16 has its emitter electrode connected through a 470-ohm resistor to conductor P1. The base electrode of transistor TR16 is connected through a 12,000-ohm resistor and a 1500-ohm resistor in series to battery, and the junction of these two resistors is connected through a 3900-ohm resistor to the start conductor 30. The collector electrode of transistor TR16 is connected to the base electrode of transistor TR13 through a 1500-ohm resistor. The emitter electrode of transistor TR13 is connected through a 2000-ohm resistor to battery. The base electrode of transistor TR13 is also connected through a 100-ohm resistor to the start conductor 30. A diode is connected with its positive electrode connected to the start conductor 30 and its cathode to the emitter electrode of transistor TR13. The collector electrode of transistor TR13 is the output connection to input terminal A2 of the matrix. In response to negative battery potential from the signal conductor P1, and ground potential applied to the start conductor 30, this first inverter unit 11 applies a ground signal to terminal A2 of the matrix. The second inverter unit 21 is similar to the first, comprising an NPN transistor TR17 and a PNP transistor TR14, with an input connection from conductor P2, and an output connection to the terminal A5 of the matrix.

The first "open" circuit unit 12 comprises a PNP transistor TR11. The emitter electrode is connected through a 2000-ohm resistor to battery. The base electrode is connected through a 100-ohm resistor to the start conductor 30, and also through a 1000-ohm resistor and a 2200-ohm resistor in series to battery. The junction of the last two resistors is the output of a gate comprising diodes D51 and D52. A diode D50 is connected with its cathode to the emitter electrode of transistor TR11 and its anode to the start conductor 30. Two inputs are connected to the gate circuit, one from matrix terminal A1 to diode 51 and the other from matrix terminal A2 to diode D52. If a ground signal appears on either of the terminals A1 or A2, the transistor TR11 is blocked and does not respond to a ground potential on start conductor 30. If the signal on conductor P1 is an open connection, and therefore no ground signal appears at either terminal A1 or A2, the transistor TR11 conducts upon the application of ground potential to start conductor 30, and a ground signal is applied from the collector electrode of transistor TR11 to input terminal A3 of the matrix. The second "open" circuit unit 22 is similar to the first, with input connections from matrix terminal A4 to gate diode D54, and from matrix terminal A5 to gate diode D55. The output connection is from the collector electrode of transistor TR12 to matrix terminal A6.

The operation of the marker will now be explained for each of the ten digits.

If the dialed digit is one, counting relays 1 and 2 are operated, signal conductor P1 is connected to ground through the 100-ohm resistor R1 and signal conductor P2 is connected to direct ground. Upon seizure of the marker direct ground is placed through the contacts of relay GM to the start conductor 30. The resistance ground through diode D51 is effective to block the "open" circuit 12 so that no signal appears at matrix terminal A3. The resistance ground signal applied to matrix terminal A1 is not effective through diodes D1 and D5 to block the transistors TR1 and TR2 because of the marginal biasing, but is effective to block the other five transistors coupled to this input. For transistor TR1, there is no ground signal applied through any of the diodes D2, D3 or D4; and therefore this transistor conducts, and ground potential appears at its collector electrode and the output number lead 1. This signal is coupled through diode D44 to matrix input terminal A7, and through diodes D13, D18, D26, D31 and D40, it blocks the transistors TR4, TR5, TR7, TR8 and TR10 respectively. Ground on conductor P2 is applied to matrix input terminal A4, and through diodes D6, D10, D15, D22, D32, and D37 it blocks transistors TR2, TR3, TR4, TR6, TR8 and TR9 respectively. Therefore all of the transistors TR2–TR10 are blocked and only transistor TR1 conducts to supply a ground signal to the number lead 1.

If the dialed digit is two, relay 3 is operated, signal conductor P1 is connected to ground through the 100-ohm resistor R1, and signal conductor P2 is connected to battery. Conductor 30 is grounded by operation of relay 30. As described for digit one, the resistance ground applied at input terminal A1 is not effective through diodes D1 and D5 to block the transistors TR1 and TR2, but is effective to prevent operation of the "open" circuit unit 12 so that no ground signal is applied to terminal A3. For transistor TR2, no ground signal is applied through any of the diodes D6, D7 or D8, so that this transistor conducts and a ground signal appears at number lead 2. This signal is coupled through diode D4 to matrix input terminal A7, and thence through diodes D13, D18, D26, D31 and D40 to block transistors TR4, TR5, TR7, TR8 and TR10 respectively. The battery signal on conductor P2 is inverted by unit 21 to apply a ground signal to matrix input terminal A5, which through diodes D3, D12, D20, D24, D28 and D38 is effective to block transistors TR1, TR3, TR5, TR6, TR7 and TR9. Therefore the transistors TR1 and TR3–TR10 are all cut off, and only transistor TR2 conducts to supply an output ground signal to number lead 2.

If the dialed digit is three, counting relays 1, 2, 3 and 4 are operated, and the connections to both signal conductors P1 and P2 are open. With ground applied to start conductor 30, both "open" circuit units 12 and 22 are actuated to apply ground signals to matrix input terminals A3 and A6 respectively. The ground signal at terminal A3 is applied through diodes D4, D8, D25, D29, D34, D39 and D42; and the ground signal at terminal A6 is applied through diodes D17, D21, D30, D35, and D34, so that transistors TR1, TR2, and TR4–TR10 are blocked, leaving only transistor TR3 to conduct and apply a ground signal to number lead 3.

If the dialed digit is four, counting relays 3 and 4 are operated, there is an open connection through signal conductor P1 and signal conductor P2 is connected to battery. In response to the ground signal on conductor 30, "open" circuit unit 12 conducts to supply a ground signal at terminal A3 to diodes D4, D8, D25, D29, D34, D39, and D42 to cut off transistors TR1, TR2, TR6, TR7, TR8, TR9 and TR10. The battery signal from conductor P2 is inverted by unit 21 to apply a ground signal at terminal A5 which through diodes D3, D12, D20, D24, D28 and D38 cuts off transistors TR1, TR3, TR5, TR6, TR7 and TR9. Therefore transistors TR1–TR3 and TR5–TR10 are cut off, and only transistor TR4 conducts to supply a ground signal to number lead 4.

If the dialed digit is five, counting relays 1, 2 and 4 are operated, the connection to signal conductor P1 is open, and conductor P2 is connected to direct ground. Responsive to the ground signal on conductor 30, unit 12 applies a ground signal at conductor A3 which cuts off transistors TR1, TR2, TR6, TR7, TR8, TR9, and TR10. The direct ground on P2 is applied at terminal A4, and cuts off transistors TR2, TR3, TR4, TR6, TR8, and TR9. Thus transistors TR1–TR4 and TR6–TR10 are blocked, and only transistor TR5 conducts to supply a ground signal to number lead 5.

If the dialed digit is six, counting relay 5 is operated, signal conductor P1 is connected to direct ground, and the connection to conductor P2 is open. Ground from conductor P1 to input terminal A1 through diodes D1, D5, D9, D14, D19, D36 and D41, cuts off transistors TR1, TR2, TR3, TR4, TR5, TR9 and TR10. Responsive to ground on conductor 30, the "open" circuit unit 22 conducts to supply a ground signal at terminal A6 which cuts off transistors TR4, TR5, TR7, TR8, and TR10. Therefore transistors TR1–TR5 and TR7–TR10 are cut off leaving only transistor TR6 to conduct and apply a ground signal to number lead 6.

If the dialed digit is seven, counting relays 1, 2, and 5 are operated, and direct ground is connected to both signal conductors P1 and P2. The ground signal at terminal A1 cuts off transistors TR1–TR5, TR9 and TR10. The ground signal at terminal A4 cuts off transistors TR2, TR3, TR4, TR8, and TR9. Thus transistors TR1–TR6 and TR8–TR10 are blocked leaving only transistor TR7 to conduct responsive to ground on conductor 30 and supply a ground signal to number lead 7.

If the dialed digit is eight, counting relays 3 and 5 are operated, signal conductor P1 is connected to direct ground, and signal conductor P2 is connected to battery. The ground signal from conductor P1 at terminal A1 cuts off transistors TR1–TR5, TR9 and TR10. Responsive to ground on conductor 30, the battery signal conductor P2 is inverted by unit 21 to apply a ground signal at terminal A5 which blocks transistors TR1, TR3, TR5, TR6, TR7 and TR9. Therefore transistors TR1–TR7, TR9 and TR10 are blocked, leaving only transistor TR8 to conduct and supply a ground signal to number lead 8.

If the dialed digit is nine, counting relays 1, 2, 3, 4, and 5 are operated, signal conductor P1 is connected to battery, and conductor P2 has an open connection. In response to ground on conductor 30, the battery signal on conductor P1 is inverted by unit 11 to apply a ground signal at terminal A2 which cuts off transistors TR1, TR2, TR3, TR4, TR6, TR7, and TR8. The "open" circuit unit 22 conducts to supply a ground signal at terminal A6 which cuts off transistors TR4, TR5, TR7, TR8 and TR10. Therefore transistors TR1–TR8 and TR10 are blocked, leaving only transistor TR9 to conduct and supply a ground signal to number lead 9.

If the dialed digit is ten, counting relays 3, 4 and 5 are operated and both signal conductors P1 and P2 are connected to battery. Responsive to ground on conductor 30, these battery signals are inverted by the units 11 and 21 respectively to supply ground signals at terminals A2 and A5. The signal at terminal A2 blocks transistors TR1–TR4 and TR6–TR8, while the signal at terminal A4 blocks transistors TR2, TR3, TR4, TR6, TR8 and TR9. Thus transistors TR1–TR9 are cut off, leaving only transistor TR10 to conduct and supply a ground signal to number lead 0.

As shown in the said U.S. Patent 2,714,628, in response to the ground signal on one of the number leads, a switching connection is made. Upon this establishment of the mark, a reset circuit in the marker is actuated. The drawings in the patent show that this signal is applied over a conductor RC, through contacts of the relay GM to operate a relay GS. To reduce the time required to release the marker, a transistor amplifier (not shown) may be added to the circuit shown in the patent. Thus the relay GS may have one of its windings connected in the collector circuit of a PNP transistor. The emitter electrode of this transistor may be connected through a 600-ohm resistor to battery, and also to the cathode of a diode having its anode connected to the contacts which upon operation of the relay GM are extended to the conductor RC. The base electrode of the transistor may also be connected through a 100-ohm resistor to these normally open contacts. The base electrode is also connected through a 470-ohm resistor to the junction of two resistors forming a voltage divider, these resistors being a 3000-ohm resistor connected to battery and a 2000-ohm resistor connected to ground. As shown in the patent, the relay GS also has another winding having one side connected to battery and the other side connected to a terminal MRA and also through contacts of a relay GD to ground. The relay GS includes contacts for opening the operate circuit of relay GM to release the marker.

While I have described above the principles of my invention in connection with specific apparatus, it is to be clearly understood that this description is made only by way of example and not as a limitation to the scope of my invention. For example, the output signal need not be ground on only one number lead, but may be a coded signal comprising ground on a plurality of the number leads.

What is claimed is:

1. A code converting arrangement for converting coded digital signals received from a source over a signal conductor, the source comprising an arrangement for selectively applying one of at least three signal conditions to the signal conductor; said code converting arrangement comprising a matrix of diode-connected conductors having input terminals receptive only to a given one of said conditions and output terminals, each of said conditions which may be applied to the signal conductor being individually associated with one of the input terminals, circuit means coupling the signal conductor to said input terminals to respond to the signal condition on the signal conductor and supply said given condition signal to the corresponding individual input terminal, to thereby apply a given condition through the matrix to predetermined ones of the output terminals.

2. A code converting arrangement according to claim 1, further including a plurality of marking conductors, a plurality of amplifying devices individually coupling said output terminals to the marking conductors, means for blocking each amplifying device having said given condition on the corresponding output terminal, a start conductor connected to each of the amplifying devices and to said circuit means, means responsive to a start signal on the start conductor to actuate the circuit means and each of the amplifying devices which is not blocked by said blocking means, to thereby apply a marking potential to the marking conductors corresponding to the actuated amplifying devices.

3. A code converting arrangement according to claim 2, wherein said coded digital signals are received over a plurality of said signal conductors, the source being arranged to selectively apply one of said signal conditions to each signal conductor; an arrangement including said circuit means for individually associating each signal condition which may be applied to each signal conductor to an individual one of said signal conductors, with the circuit means arranged to respond to the condition on each signal conductor to supply the given condition to the corresponding input terminals.

4. A code converting arrangement according to claim 3, wherein said given condition comprises two subconditions, wherein said amplifying devices are divided into a first group and a second group, and said blocking means comprises an arrangement for blocking any amplifying device to which a first of said subconditions is applied, and for blocking only amplifying devices of the second group to which the second of said subconditions is applied, and means responsive to a second of said subcondition signals applied at the matrix output terminal corresponding to an amplifying device of the second group for applying a given condition signal at another of said matrix input terminals.

5. A code converting arrangement according to claim 1, wherein said signal conditions comprise an open connection, a connection to a first polarity pole, and a connection to a second polarity pole of a potential supply, and said given condition is a first polarity signal; said circuit means comprising a direct connection from said signal conductor to a first of said matrix input terminals, an inverter unit receptive only to signals of a second polarity to supply output signals of the first polarity, means connecting said inverter unit between said signal conductor and a second of said input terminals, and an "open" unit connected to supply first polarity signals to a third of said input terminals responsive to an "open" signal on said signal conductor.

6. A code translating arrangement according to claim 5, wherein said "open" unit includes a diode gate circuit having respective inputs connected to the first and second matrix input terminals, and means to produce a first polarity signal supplied to said third matrix input terminal in response to the absence of first polarity signals at said diode gate inputs.

7. A code converting arrangement according to claim 5, wherein said coded digital signals are received over a plurality of signal conductors, the source being arranged to selectively apply one of said signal conditions to each signal conductor; and said circuit means includes means for individually associating each signal condition which may be applied to each signal conductor with one of said matrix input terminals, to supply a first polarity signal to the input terminals in response to the corresponding condition on the associated signal conductor.

8. A code converting arrangement according to claim 5, further including a plurality of marking conductors, a plurality of amplifying devices individually coupling said output terminals to the marking conductors, means for blocking each amplifying device having said given condition on the corresponding output terminal, a start conductor connected to each of the amplifying devices and to said circuit means, means responsive to a start signal on the start conductor to actuate the circuit means and each of the amplifying devices which is not blocked by said blocking means, to thereby apply a marking potential to the marking conductors corresponding to the actuated amplifying devices.

9. A code converting arrangement according to claim 8, wherein said signal conditions further include a resistance first polarity signal produced by a connection at said source through a resistance device to said first polarity pole; said blocking means comprising a biasing arrangement at said amplifying devices and which is marginal biasing for at least one of the amplifying devices, the biasing being effective to block any amplifying device to which a direct first polarity signal is applied through the matrix to the corresponding output terminal, and to block any except the marginally biased amplifying devices to which a resistance first polarity signal is supplied, the marginally biased amplifying device being actuated in response to a resistance first polarity signal at its corresponding matrix output terminal and to the start signal to apply a first polarity signal to the corresponding marking conductor, and means connecting the last said marking conductor to another input terminal of the matrix to thereby apply a first polarity signal to the last said matrix input terminal in response to the resistance first polarity signal at the output terminal of the said marginally biased amplifying device.

10. A code converting arrangement according to claim 9, further including a second signal conductor, said source having an arrangement for selectively connecting the second signal conductor with an open connection, a connection to the first polarity pole, and a connection to the second polarity pole of the potential supply; and wherein said circuit means further includes a direct connection, a connection through a second inverter unit, and a connection through a second "open" unit from said signal conductor to three further ones of said matrix input terminals.

11. A code converting arrangement according to claim 10, wherein said matrix has ten said output terminals, said amplifying devices are transistors each having emitter, base, and collector electrodes, each having its collector electrode connected to the corresponding one of said marking conductors, having its emitter electrode coupled to said start conductor, and having its base electrode coupled to the corresponding matrix output terminal, two of the transistors having said marginal biasing arrangement and having their corresponding marking conductors connected through respective diodes to the same matrix input terminal, said coded digital signals comprising one of said signal conditions on each of the two said signal conductors, and responsive to each said digital signal and said start signal nine of the transistors are blocked by said blocking means and the other transistor is actuated to conduct and supply a first polarity marking signal to an output.

12. A code converting arrangement according to claim 11, wherein each of said inverter units, and each of said "open" units includes transistor circuit means.

References Cited in the file of this patent

UNITED STATES PATENTS

| | | |
|---|---|---|
| 2,673,936 | Harris | Mar. 30, 1954 |
| 2,864,962 | Jensen | Dec. 16, 1958 |

OTHER REFERENCES

Publication I, "Rectifier Networks for Multi-position Switching," by D. R. Brown and N. Rochester, Proceedings of the I.R.E., February 1949, pp. 139–147.

Publication II, "What's Inside Transac, I," by A. L. Cavalieri, Jr., Electronic Design, July 1, 1956, pp. 22–25.